(12) United States Patent
Ohnishi

(10) Patent No.: US 6,615,674 B2
(45) Date of Patent: Sep. 9, 2003

(54) CLAMP-ON ULTRASONIC FLOWMETER

(76) Inventor: Kazumasa Ohnishi, 121-35, Hanazonohigashi 2-chome, Nagaoka, Niigata (JP), 940-0846

(*) Notice: Subject to any disclaimer, the term of this patent is extended or adjusted under 35 U.S.C. 154(b) by 0 days.

(21) Appl. No.: 10/041,604

(22) Filed: Jan. 10, 2002

(65) Prior Publication Data

US 2002/0139198 A1 Oct. 3, 2002

(30) Foreign Application Priority Data

Apr. 2, 2001 (JP) .................................. 2001-137887
Nov. 29, 2001 (JP) .................................. 2001-364923

(51) Int. Cl.$^7$ ................................................ G01F 1/66
(52) U.S. Cl. ........................................... 73/861.27
(58) Field of Search ...................... 73/861.27, 861.26, 73/861.28, 861.08, 61.49, 861.18; 310/334

(56) References Cited

U.S. PATENT DOCUMENTS 4,598,593 A * 7/1986 Sheen et al. ............... 73/861.04
5,214,343 A * 5/1993 Baumoel .................... 310/334
5,856,622 A * 1/1999 Yamamoto et al. ........ 73/861.28
6,293,156 B1 * 9/2001 Shen et al. ................ 73/861.26

* cited by examiner

Primary Examiner—Edward Lefkowitz
Assistant Examiner—Jewel V. Thompson
(74) Attorney, Agent, or Firm—Nixon Peabody LLP; Jeffrey L. Costellia

(57) ABSTRACT

A clamp-on ultrasonic flowmeter has a pair of ultrasonic transmitting-receiving devices which are placed on a pipe in which a liquid flows. Each device is composed of a composite of a ultrasonic transducer and a ultrasonic propagating element which propagates ultrasonic wave transmitted by the transducer predominantly in the direction perpendicular to a plane of the transducer (which is arranged at an acute angle from the center line of the pipe), and a ultrasonic propagating layer placed between the ultrasonic propagating element and the pipe. The ultrasonic propagating layer has a viscosity of $0.5 \times 10^{-3}$ to $3 \times 10$ Pa.sec at 25° C. and a rate of sonic propagation in terms of $V_1$ at 25° C. satisfying the condition of $0.5 < V_1/V_2 < 1.7$ in which $V_2$ represents a rate of sonic propagation of material of the pipe at 25° C. Otherwise, the ultrasonic propagating layer has a rate of penetration of needle in the range of 10 to 300 at 25° C. and a rate of sonic propagation satisfying the same condition.

36 Claims, 11 Drawing Sheets

CLAMP-ON ULTRASONIC FLOWMETER

FIELD OF THE INVENTION

The invention relates to a clamp-on ultrasonic flowmeter, a flow rate-measuring structure, and a ultrasonic transmitting-receiving device.

BACKGROUND OF THE INVENTION

The clamp-on ultrasonic flowmeter is attached to a outer surface of a pipe in which a fluid flows, for measuring from outside of the pipe a volume of the fluid flowing inside of the pipe. The clamp-on ultrasonic flowmeters are generally classified into two types. One utilizes a difference of propagating rates, and another utilizes the Doppler effect.

In the mode utilizing a difference of propagating rates, a pair of ultrasonic waves are propagated under such condition that one ultrasonic wave is propagated downstream to cross the stream of fluid while another ultrasonic wave is propagated upstream to cross the stream of fluid. Then, the time required for propagating the downstream ultrasonic wave between the predetermined distance and the time required for propagating the upstream ultrasonic wave between the same distance are compared to determine the flow rate.

In the mode utilizing the Doppler effect, the flow rate is determined by measuring a rate of particle or babble flowing with the fluid, under assumption that the particle or babble moves at a rate equal to that of the moving fluid. The moving rate of the particle or babble can be determined, by detecting variation of ultrasonic frequency from that of ultrasonic wave applied to the moving particle or babble to that of ultrasonic wave reflected to the moving particle or babble.

A representative constitution of a known clamp-on ultrasonic flowmeter is illustrated in FIG. 17 in the form of a sectional view. The clamp-on ultrasonic flowmeter of FIG. 17 utilizes a difference of propagating rates of ultrasonic wave. The clamp-on ultrasonic flowmeter is composed of a pair of ultrasonic transmitting-receiving devices 1a, 1b. The ultrasonic transmitting-receiving device 1a is composed of a ultrasonic transducer 2a and a ultrasonic propagating element in the form of wedge 3a. The ultrasonic propagating element 3a has a bottom surface 4a and a slanting surface 5a extending from one edge of the bottom surface 4a at an acute angle. The ultrasonic transducer 2a is attached on the slanting surface 5a. The ultrasonic transducer 2a has an electrode (not shown) and a lead line (not shown) on the side facing the propagating element 3a and on another side. The combination of the electrode and lead line serves to apply electric voltage to the transducer 2a. In the same way, the ultrasonic transmitting-receiving device 1b is composed of a ultrasonic propagating element 3b having a slanting surface 5b on which the ultrasonic transducer 2b is attached.

Each of the ultrasonic transducers 2a, 2b transmits ultrasonic wave to the ultrasonic propagating element when an electric voltage is applied thereto, while it produces an electric voltage when it receives ultrasonic wave. Accordingly, the ultrasonic transmitting-receiving device 1a, 1b equipped with a ultrasonic transducer functions as a transmitter and a receiver. The ultrasonic transmitting-receiving devices 1a, 1b are provided on a pipe 6 in such manner that the ultrasonic waves transmitted by the devices 1a, 1b propagate across the fluid 7 which flows inside of the pipe in the direction indicated by arrow 8, that is, on the route 9 (indicated by a dotted line) in the directions indicated in FIG. 17 by arrows 9a, 9b.

The flow rate of the fluid 7 flowing inside of the pipe 6 is determined by the following method. First, a voltage pulse is applied to the ultrasonic transducer 2a of the ultrasonic transmitting-receiving device 1a, so as to transmit a ultrasonic wave. The ultrasonic wave propagates in the ultrasonic propagating element 3a, a wall of pipe 6, fluid 7, a wall of pipe 6 on the opposite side, and ultrasonic propagating element 3b on the route indicated in FIG. 17 by the dotted line 9. Subsequently, the ultrasonic wave is received by the ultrasonic transducer 2b of the ultrasonic transmitting-receiving device 1b, to output a voltage signal. A period of time ($T_1$) from the time when the ultrasonic wave is transmitted by the ultrasonic transmitting-receiving device 1a to the time when the ultrasonic wave is received by the ultrasonic transmitting-receiving device 1b is detected. Subsequently, a voltage pulse is applied to the ultrasonic transducer 2b of the ultrasonic transmitting-receiving device 1b, so as to transmit a ultrasonic wave. The ultrasonic wave is then propagate on the same route, but in the opposite direction, and the ultrasonic transducer 2a of the ultrasonic transmitting-receiving device 1a receives the propagated ultrasonic wave. A period of time ($T_2$) from the time when the ultrasonic wave is transmitted by the ultrasonic transmitting-receiving device 1b to the time when the ultrasonic wave is received by the ultrasonic transmitting-receiving device 1a is detected.

The period of time ($T_1$) required for the propagation of ultrasonic wave from the device 1a to the device 1b along the arrow 9a differs from the period of time ($T_2$) required for the propagation of ultrasonic wave from the device 1b to the device 1a along the arrow 9b. The period of time ($T_1$) is shorter than a period of time required for propagating ultrasonic wave in still water because the ultrasonic wave from the device 1a to the device 1b is propagated at an increased rate by the aid of the flowing fluid, while the period of time ($T_2$) is longer than a period of time required for propagating ultrasonic wave in still water because the ultrasonic wave is propagated from the device 1b to the device 1a against the stream of the fluid. Thus, the difference of the propagation period ($T_2-T_1$) is relative to the rate of movement of the flowing fluid 7. Therefore, the rate of movement of the flowing fluid is calculated from the difference of propagation period. The flow rate of the fluid 7 is then determined from the difference of propagation period and the sectional area of the inside of the pipe 6.

In the conventional clamp-on ultrasonic flowmeter, the ultrasonic propagating element in the wedge form is made of solid material such as epoxy resin, acryl resin, or stainless steal.

Thus, the clamp-on ultrasonic flowmeter is advantageous in that it can determine the flow rate with no direct contact with the flowing fluid. In order to employ the clamp-on ultrasonic flowmeter more advantageously, however, a study should be made on the clamp-on ultrasonic flowmeter for increasing the measuring sensitivity.

As is apparent from the principle of measurement adopted by the clamp-on ultrasonic flowmeter, if the ultrasonic wave impinges on the outer surface of the pipe, the measurement of flow rate cannot be made because no difference is produced between the periods of ultrasonic wave propagation. Accordingly, the ultrasonic wave should be applied on the pipe surface obliquely, namely, at an acute angle. However, if the ultrasonic wave is applied on the pipe surface obliquely, a portion of the ultrasonic wave is caused not to penetrate into the pipe wall. The decrease of penetration of ultrasonic wave on the outer surface of the pipe causes to reduce the sensitivity of the clamp-on ultrasonic flowmeter.

The decrease of penetration of ultrasonic wave occurring when the ultrasonic wave is applied on the pipe surface obliquely is caused by reflection of the obliquely applied ultrasonic wave on the pipe surface. The reflection increases when the ultrasonic wave is applied at a larger angle of incidence, and further when the difference of sonic propagation rate between the material of the ultrasonic propagating element and the material of the pipe.

If the difference of sonic propagation rate between the ultrasonic propagating element and the pipe decreases, the reflection of ultrasonic wave on the pipe surface decreases. Therefore, it may be assumed that the reflection decreases if the ultrasonic propagating element and the pipe are made of the same material.

However, this can not be done, because most of the materials for the production of pipes attenuate ultrasonic wave passing through them. The attenuation of ultrasonic wave is understood to be caused by conversion of the ultrasonic wave (longitudinal wave) into a traverse wave or conversion into thermal energy.

Examples of the conventionally employed pipe materials are stainless steel (rate of sonic propagation: approx. 5,000 m/sec.), vinyl chloride resin (approx. 2,200 m/sec.) and fluororesin (approx. 1,200 m/sec.).

Generally, it is specifically difficult to design a clamp-on ultrasonic flowmeter of high sensitivity for the use in conjunction with a pipe made of material having a small rate of sonic propagation (typically fluororesin).

SUMMARY OF THE INVENTION

Accordingly, the present invention has an object to provide a clamp-on ultrasonic flowmeter giving an improved high sensitivity.

The invention has another object to provide a flow rate-measuring structure giving an improved high sensitivity.

The invention has a further object to provide a new ultrasonic transmitting-receiving device.

The present inventor has succeeded in providing a clamp-on ultrasonic flowmeter in which the ultrasonic wave transmitted by the ultrasonic transducer efficiently penetrates into the pipe surface and accordingly which shows an improved high sensitivity, by constituting the ultrasonic propagating area of the ultrasonic transmitting-receiving device from a combination of an obliquely arranged ultrasonic propagating element which propagates ultrasonic wave transmitted by the ultrasonic transducer predominantly in the direction perpendicular to a plane of the transducer, and a ultrasonic propagating layer placed between the ultrasonic propagating element and the pipe, which has a specific viscosity or rate of penetration of need and a specific rate of sonic propagation as compared with a rate of sonic propagation of material of the pipe.

The invention resides in a flow rate-measuring structure comprising a pipe in which a fluid flows and a pair of ultrasonic transmitting-receiving devices arranged on the pipe at an outer surface thereof, each transmitting-receiving device comprising a composite of a ultrasonic transducer and a ultrasonic propagating element which propagates ultrasonic wave transmitted by the transducer predominantly in the direction perpendicular to a plane of the transducer, the composite being arranged at an acute angle from the center line of the pipe, and a ultrasonic propagating layer placed between the ultrasonic propagating element and the pipe, which has a viscosity in the range of $0.5 \times 10^{-3}$ to $3 \times 10$ Pa.sec at 25° C. and a rate of sonic propagation in terms of $V_1$ at 25° C. satisfying the condition of $0.5 < V_1/V_2 < 1.7$ in which $V_2$ represents a rate of sonic propagation of material of the pipe at 25° C.

The invention also resides in a flow rate-measuring structure comprising a pipe in which a fluid flows and a pair of ultrasonic transmitting-receiving devices arranged on the pipe at an outer surface thereof, each transmitting-receiving device comprising a composite of a ultrasonic transducer and a ultrasonic propagating element which propagates ultrasonic wave transmitted by the transducer predominantly in the direction perpendicular to a plane of the transducer, the composite being arranged at an acute angle from the center line of the pipe, and a ultrasonic propagating layer placed between the ultrasonic propagating element and the pipe, which has a rate of penetration of needle in the range of 10 to 300 at 25° C. and a rate of sonic propagation in terms of $V_1$ at 25° C. satisfying the condition of $0.5 < V_1/V_2 < 1.7$ in which $V_2$ represents a rate of sonic propagation of material of the pipe at 25° C.

The rate of penetration of needle is a value measured by the method defined in JIS K 2220 (2001). The weight applied in the penetration measurement is 9.38 g.

The invention further resides in a ultrasonic transmitting-receiving device comprising a composite of a ultrasonic transducer and a ultrasonic propagating element which propagates ultrasonic wave transmitted by the transducer predominantly in the direction perpendicular to a plane of the transducer, the composite being arranged at an acute angle from the center line of the pipe, and a ultrasonic propagating layer placed between the ultrasonic propagating element and the pipe, which has a viscosity in the range of $0.5 \times 10^{-3}$ to $3 \times 10$ Pa.sec at 25° C. and a rate of sonic propagation at 25° C. is in the range of 700 to 2,000 m/sec.

invention furthermore resides in a ultrasonic transmitting-receiving device comprising a composite of a ultrasonic transducer and a ultrasonic propagating element which propagates ultrasonic wave transmitted by the transducer predominantly in the direction perpendicular to a plane of the transducer, the composite being arranged at an acute angle from the center line of the pipe, and a ultrasonic propagating layer placed between the ultrasonic propagating element and the pipe, which has a rate of penetration of needle in the range of 10 to 300 at 25° C. and a rate of sonic propagation at 25° C. is in the range of 700 to 2,000 m/sec.

In the invention, the following embodiments are preferred.

(1) The ultrasonic propagating layer comprises a liquid.
(2) The ultrasonic propagating layer comprises water, oil, glycerol, water glass, vaseline, or grease.
(3) The ultrasonic propagating layer comprises elastic material.
(4) The ultrasonic propagating layer comprises polymeric gel.
(5) The ultrasonic propagating layer comprises polyurethane gel or silicone gel.
(6) The ultrasonic propagating layer is placed in a case having an opening on a bottom surface thereof.
(7) Both of the composite and the ultrasonic propagating layer are placed in a case having an opening on a bottom surface thereof.
(8) The ultrasonic propagating element is composed of a plurality of sheet units in which each sheet unit is composed of plural high modulus fibers aligned in parallel in resinous material.
(9) The sheet units of the ultrasonic propagating element are produced under the condition that the high modulus fibers in one sheet unit are arranged to make a right angle with the high modulus fibers in an adjoining sheet unit.
(10) The pipe is made of fluororesin.

DETAILED DESCRIPTION OF THE INVENTION

The present invention is further described by referring to the figures given in the attached drawings.

Figure 1:
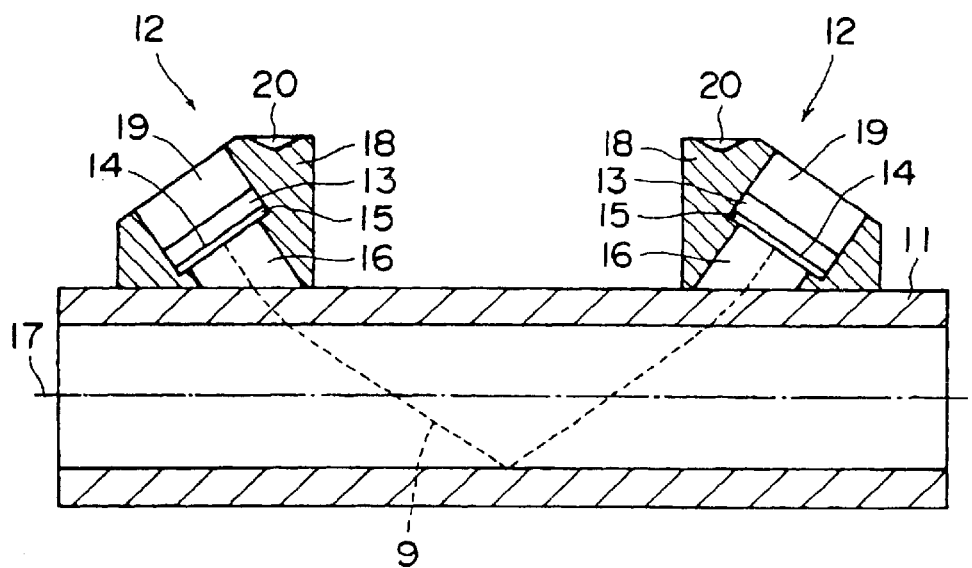
FIG. 1 is a schematic view of one flowmeter according to the invention.
Figure 2:
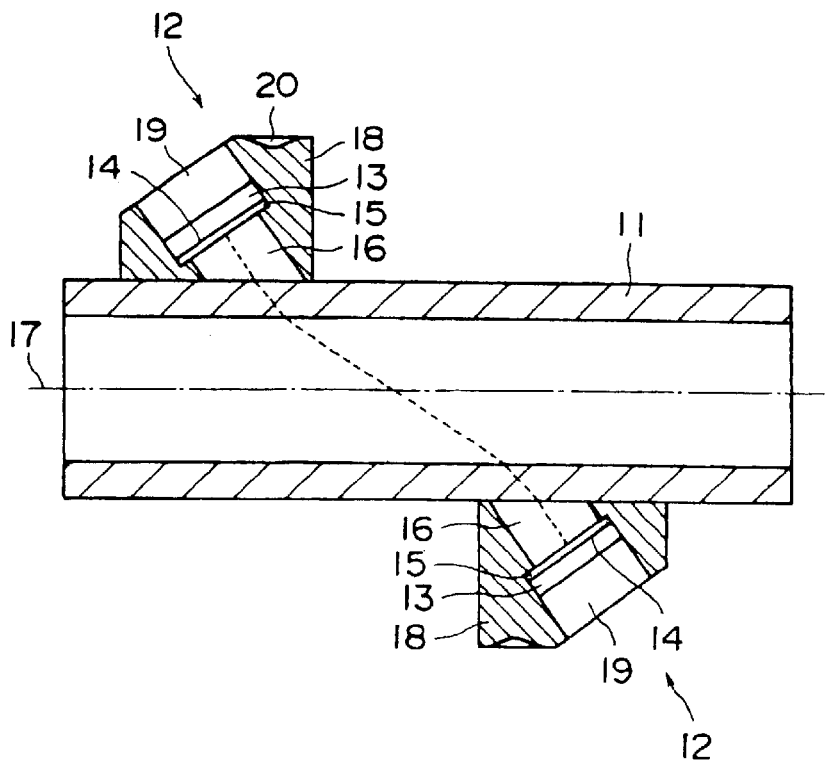
FIG. 2 is a schematic view of another flowmeter according to the invention.
Figure 17:
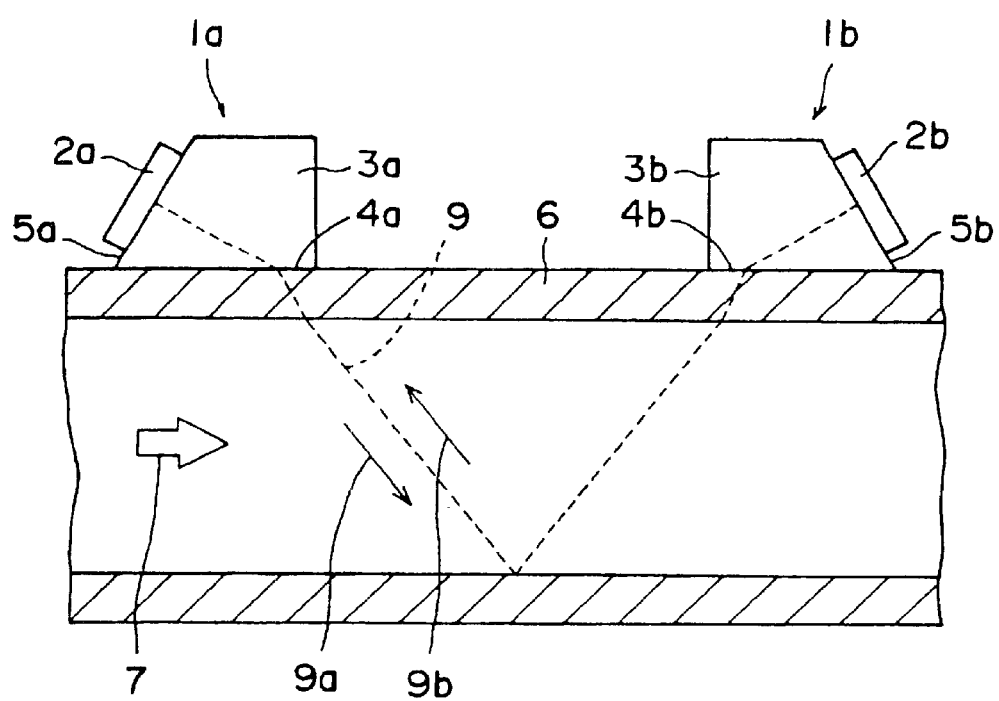
FIG. 17 shows a section of the conventional clamp-on ultrasonic flowmeter.

FIG. 1 is a sectional view of one flow rate-measuring structure according to the invention. In FIG. 1, on a pipe 11 are placed a pair of ultrasonic transmitting-receiving devices 12. The arrangement per se is the same as that of the conventional flow rate-measuring structure of V-mode, which is illustrated in FIG. 17. The arrangement of Z-mode is illustrated in FIG. 2.

The ultrasonic transmitting-receiving device 12 is composed of a composite of a ultrasonic transducer 13 and a ultrasonic propagating element 15 which propagates ultrasonic wave transmitted by the transducer predominantly in the direction perpendicular to a plane 14 of the transducer and a ultrasonic propagating layer 16 placed between the ultrasonic propagating element 15 and the pipe 11.

The composite is arranged at an acute angle from the center line 17 of the pipe 11.

The ultrasonic propagating layer 16 has a viscosity in the range of $0.5 \times 10^{-3}$ to $3 \times 10$ Pa.sec at 25° C. and a rate of sonic propagation in terms of $V_1$ at 25° C. satisfying the condition of $0.5 < V_1/V_2 < 1.7$ in which $V_2$ represents a rate of sonic propagation of material of the pipe at 25° C. Typically, the rate of sonic propagation of the ultrasonic propagating layer at 25° C. is in the range of 700 to 2,000 m/sec. An example of the material for producing the above-mentioned ultrasonic propagating layer is a liquid such as water, oil, glycerol, water glass, vaseline, or grease.

Otherwise, the ultrasonic propagating layer 16 has a rate of penetration of needle in the range of 10 to 300 (preferably 10 to 200) at 25° C. and a rate of sonic propagation in terms of $V_1$ at 25° C. satisfying the condition of $0.5 < V_1/V_2 < 1.7$ in which $V_2$ represents a rate of sonic propagation of material of the pipe at 25° C. Examples of the materials for producing the ultrasonic propagating layer include elastic material and polymeric gel. Examples of the polymeric gels include polyurethane gel and silicon gel. The polymeric gels are commercially available from Three Bond Co., Ltd., Toray-Dow Corning Co., Ltd., Shin-Etsu Chemical Industry Co., Ltd., Polysis Co., Ltd. Takilon Co. Ltd., and Geltech Co., Ltd.

If the ultrasonic propagating layer 16 comprises a liquid or other material which is not self-supporting. The material of the ultrasonic propagating layer 16 is placed in a vessel or case 18 having an opening on its upper surface as well as on its bottom surface. The composite of ultrasonic transducer 13 and ultrasonic propagating element 15 can be also placed in the vessel 18, as is illustrated in FIG. 1. The vessel can be made of polymer material such as high density polyethylene, low density polyethylene, polyvinyl chloride, (meth)acrylic resin, epoxy resin (baked), polyamide, polyacetal, polypropylene, or polycarbonate. On the bottom of the ultrasonic propagating layer can be placed a plastic cover sheet for keeping the material in the vessel.

When the ultrasonic propagating layer 16 is made of polymeric gel, curable polymeric gel is placed in the vessel from the opening, and then the gel is cured.

The ultrasonic propagating layer 16 also functions to bring the ultrasonic transmitting-receiving device into close contact with the pipe surface.

The ultrasonic propagating element 15 is preferably made of a plurality of sheet units in which each sheet unit is composed of plural high modulus fibers aligned in parallel in resinous material. The use of these sheet units for the production of the ultrasonic propagating element 15 is effective to more enhance the sensitivity of the flowmeter.

There are no specific limitations on the direction of alignment of the high modulus fibers, so long as the fibers are aligned in parallel to the oblique plane 14 of the ultrasonic transducer 13.

Preferably, the ultrasonic propagating element 15 is produced by combining a plurality of sheets units in thickness direction in which plural high modulus fibers are aligned in parallel to each other are embedded in resinous material along the sheet plane.

The sheet units of the first ultrasonic propagating are preferably produced under the condition that the high modulus fibers in one sheet unit are arranged to make a right angle with the high modulus fibers in an adjoining sheet unit. A block of fiber-reinforced resinous material produced under the above-mentioned conditions is commercially available. Accordingly, the first ultrasonic propagating member can be produced by appropriately cutting the commercially available fiber-reinforced resinous material block.

The high modulus fiber preferably has a tensile modulus of higher than 50 GPa, more preferably 100 GPa or higher. Examples of the high modulus fibers include carbon fiber, silicon carbide fiber, polyamide fiber, and aramide fiber.

Examples of the resinous materials for the production of the fiber-reinforced resinous material include epoxy resin, polyamide resin, polyimide resin, polyetherether ketone (PEEK) resin, phenol resin, unsaturated polyester resin, polycarbonate resin, and polyamideimide resin. Preferred is epoxy resin.

Some information on the use of fiber-reinforced resinous material for flowmeter is given in Japanese Patent Provisional Publication H7-284198.

If a space (containing air) is present between the ultrasonic propagating layer 16 and the pipe 6, the ultrasonic wave is reflected on the interface between the propagating element and air. This is because the impedance of air is low, as compared with the that of the propagating element. Therefore, contact material (i.e., buffer materia) is preferably inserted between the ultrasonic propagating element and the pipe for removing the air from the space between the propagating element and the pipe surface. The ultrasonic propagating layer 16 can serve as the contact material.

Otherwise, the contact material can be placed on the pipe surface by the steps of coating the contact material on the outer surface of the pipe and placing the ultrasonic transmitting-receiving device on the coated contact.

The V-mode is advantageous, because it gives a totally long passage (which gives a relatively high sensitivity), as compared with the total passage given by the Z-mode. Moreover, a pair of the ultrasonic transmitting-receiving devices are easily attached to the outer surface of the pipe 6 in the V-mode arrangement.

The clamp-on ultrasonic flowmeter of the invention is further described below in more detail.

Figure 3:
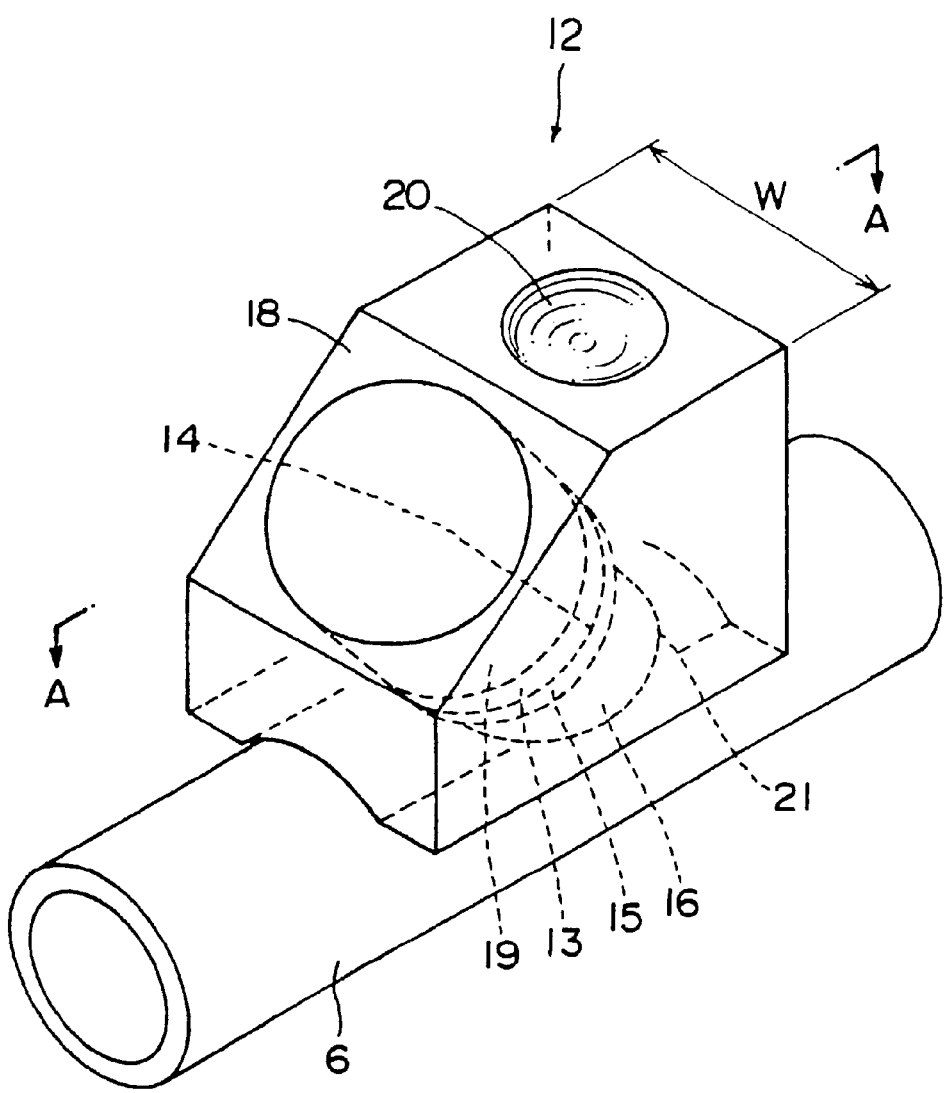
FIG. 3 is a schematic view of a ultrasonic transmitting-receiving device according to the invention.
Figure 4:
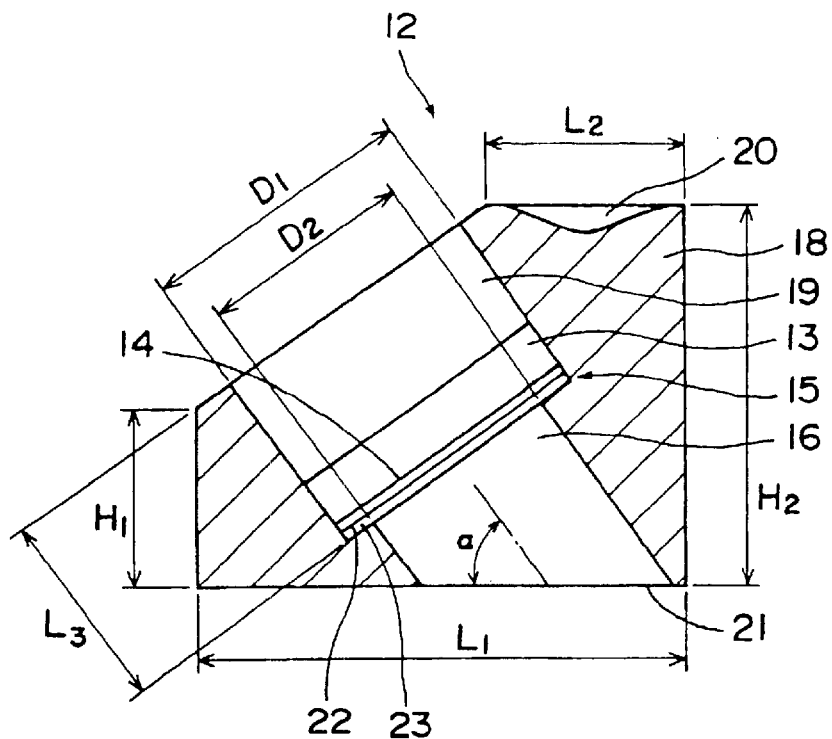
FIG. 4 is a sectional view taken along A—A line of the device of FIG. 3.

FIG. 3 is a schematic view of a ultrasonic transmitting-receiving device according to the invention. The ultrasonic transmitting-receiving device of FIG. 3 corresponds to that illustrated in FIGS. 1 and 2. FIG. 4 is a section taken along A—A line of the device of FIG. 3.

If the ultrasonic propagating layer is made of silicone gel, the bottom plane of the propagating layer is preferably-adjusted to have an angle (a) between the normal of the bottom plane 14 of the transducer 13 and the bottom plane 21 of the layer in the range of 45 to 65°. Therefore, the ultrasonic wave impinges onto the outer surface of the pipe at an angle of incidence in the range of 45 to 25°.

If the ultrasonic propagating layer is made of polyurethane gel, the bottom plane of the propagating layer is preferably adjusted to have an angle ($\alpha$) between the normal of the bottom plane 14 of the transducer 13 and the bottom plane 21 of the layer in the range of 20 to 40°. Therefore, the ultrasonic wave impinges onto the outer surface of the pipe at an angle of incidence in the range of 70 to 50°.

On the upper surface of the vessel 18 of the ultrasonic transmitting-receiving device 12 is preferably provided a concave 20, as illustrated in FIGS. 3 and 4. The concave 20 can be utilized when the device 12 should be pushed onto the outer surface of the pipe.

As is illustrated in FIGS. 3 and 4, a backing material 19 is preferably placed on the ultrasonic transducer 13. The backing material 19 is preferably prepared from epoxy resin which may have a filler such as tungsten powder.

Figure 5:
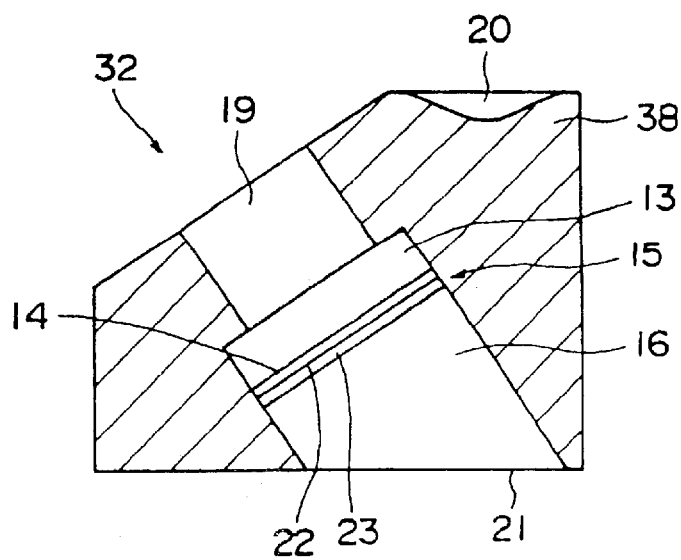
FIG. 5 is a schematic view of another ultrasonic transmitting-receiving device according to the invention.
Figure 6:
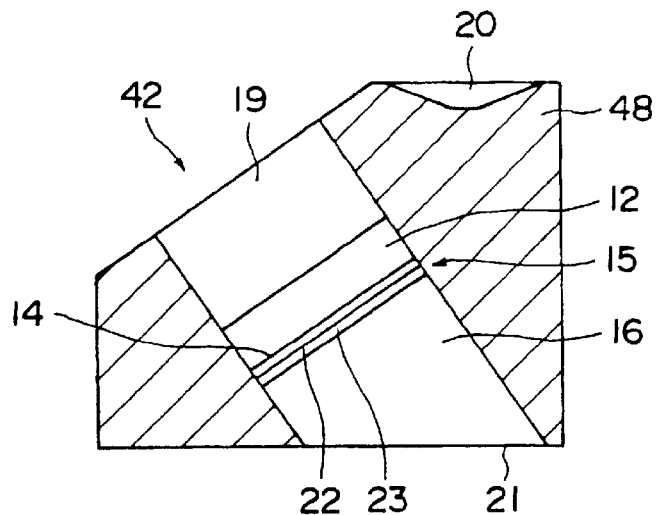
FIG. 6 is a schematic view of a further ultrasonic transmitting-receiving device according to the invention.
Figure 7:
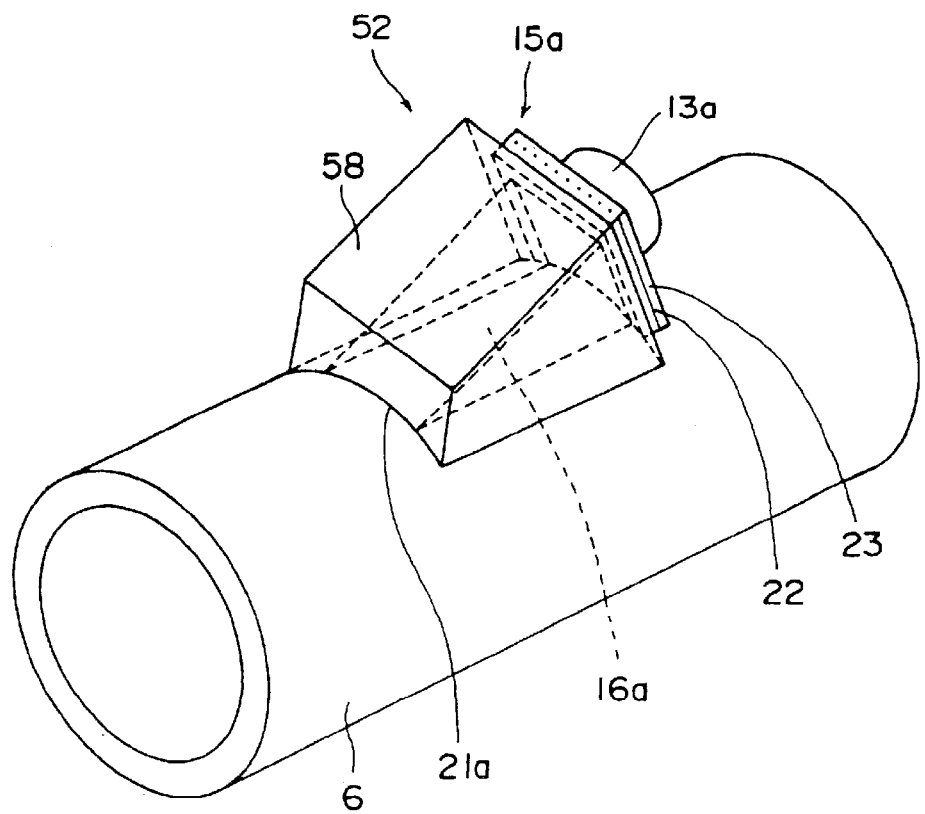
FIG. 7 is a schematic view of a further ultrasonic transmitting-receiving device according to the invention.

Variations of the vessel of the ultrasonic transmitting-receiving device are illustrated in FIGS. 5 and 6. The ultrasonic transmitting-receiving devices 32, 42 have a figure differing that of the device 12 of FIGS. 3 and 4. A variation of the vessel of the ultrasonic transmitting-receiving device is also illustrated in FIG. 7, in which the device 52 has a vessel 58 in which the ultrasonic propagating layer 16a only is placed in the vessel. The ultrasonic transducer 13a and ultrasonic propagating element 15a (which is composed of a high modulus fiber 22 and a resinous material 23) are placed outside of the vessel 58. The bottom plane 16 of the layer 16 is placed in close contact with the outer surface of the pipe 6.

Figure 8:
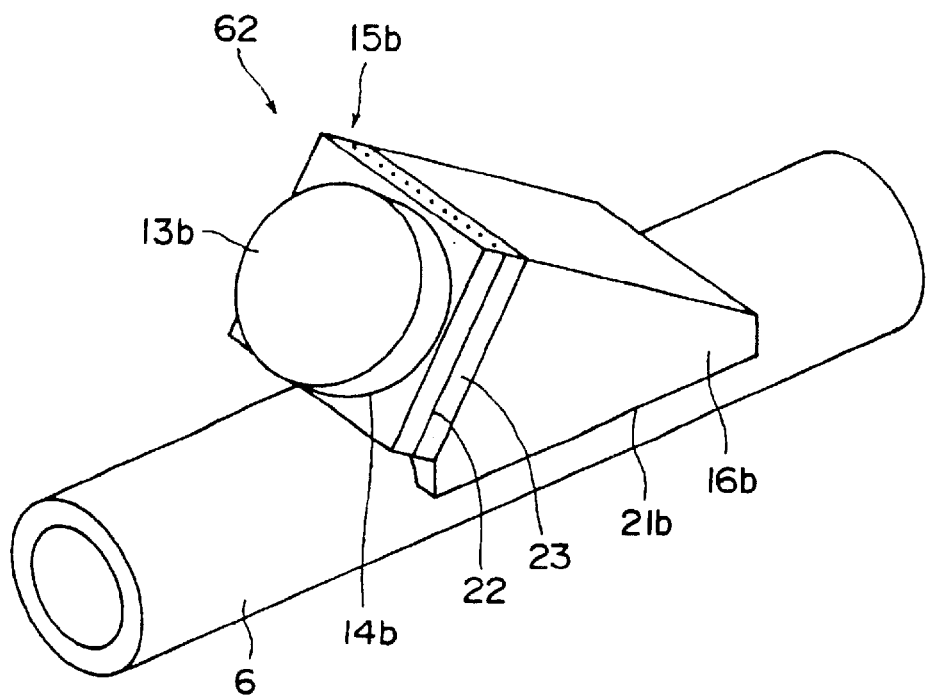
FIG. 8 is a schematic view of a further ultrasonic transmitting-receiving device according to the invention.

In FIG. 8, no vessel is employed for the preparation of the ultrasonic transmitting-receiving device 62, since the ultrasonic propagating layer 16b is self-supporting layer made of a polymeric gel. The ultrasonic transducer 13b and ultrasonic propagating element 15b (which is composed of a high modulus fiber 22 and a resinous material 23) are placed on the ultrasonic propagating layer 16b.

Figure 9:
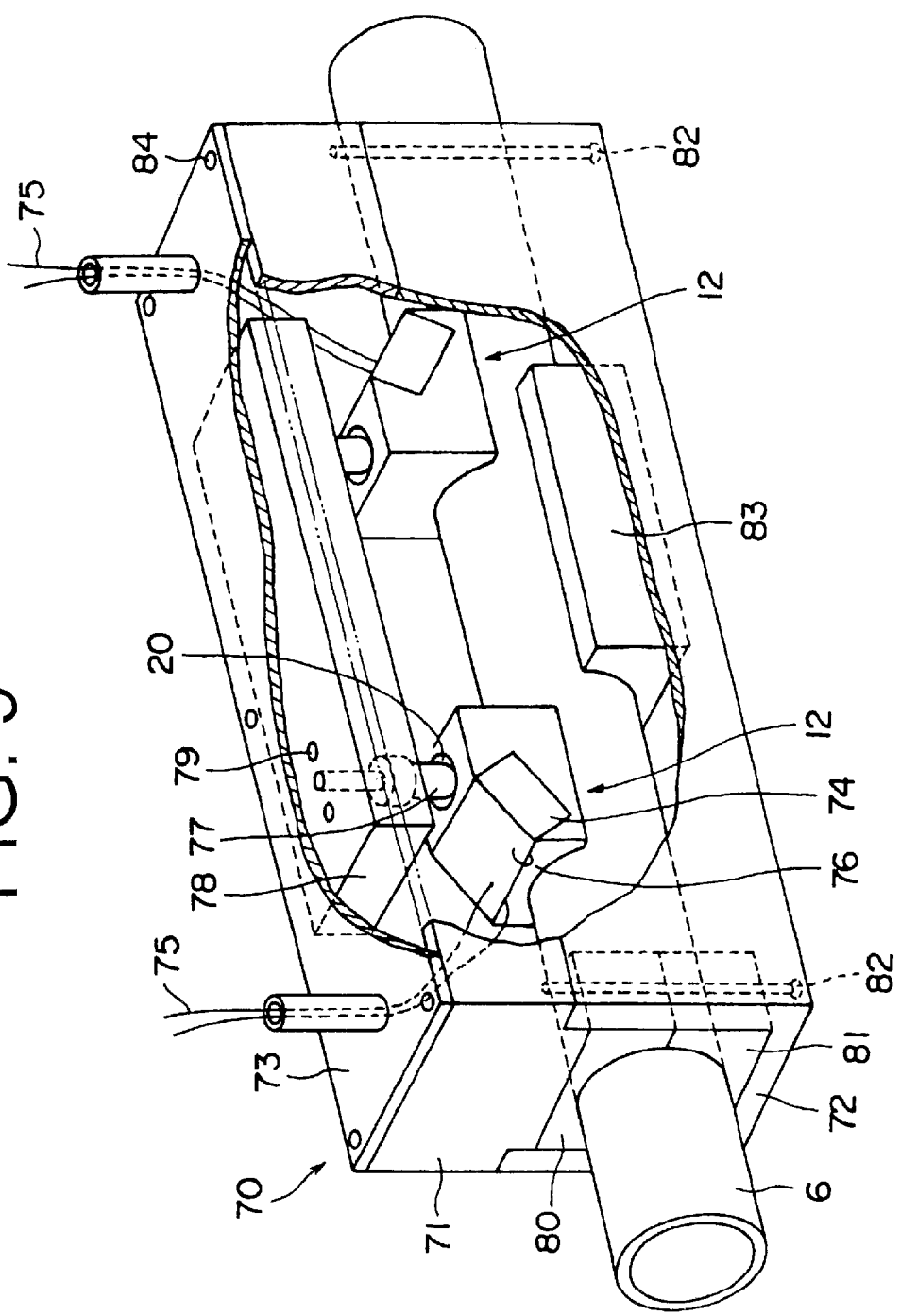
FIG. 9 is a partially cutaway schematic view of a clamp-on ultrasonic flowmeter according to the invention.

FIG. 9 is a partially cutaway schematic view of a clamp-on ultrasonic flowmeter according to the invention.

The clamp-on ultrasonic flowmeter of the invention practically comprises a pair of the ultrasonic transmitting-receiving devices of the invention and means for fixing the transmitting-receiving devices onto the pipe (or tube). For instance, a pair of the ultrasonic transmitting-receiving devices 12 are linearly arranged within a long case 70 having opening on its bottom and optionally on a cover plate 73 under the condition that the oblique surfaces on each of which the ultrasonic transducer is attached do not face each other, as illustrated in FIG. 1. The long case 70 comprises a casing body 71 and the cover plate 73. The cover plate 73 having an openings 79 is fixed to the casing body 71 by means of screws 84. Electric lines 75, 76 are connected to the ultrasonic transducer (not shown) under the covering 74.

If the sizes of the pipe (i.e., inner diameter and outer diameter) and nature of the pipe material are previously known, an appropriate distance between the ultrasonic transmitting-receiving devices 12 can be calculated separately. Accordingly, the devices 12 can be previously fixed in the long case at an appropriate space using the upper openings 79 and a pair of positioning poles 77. A clamp-on ultrasonic flowmeter comprising the long case 70 in which a pair of the ultrasonic transmitting-receiving devices are fixed at a predetermined space is easily set to various pipes of chemical plants or other pipe system.

The fixation of the flowmeter to a pipe is easily and reliably accomplished by placing the pipe 6 between the case 70 and a flowmeter-fixing aid 72 and then combining the case 70 and the fixing aid 72 by means of screws 82. The fixing method is not limitative. For instance, the case 70 can be fixed to the pipe 6 using a rubber band.

If the sizes of the pipe (i.e., inner diameter and outer diameter) and nature of the pipe material are not known, the distance between the ultrasonic transmitting-receiving devices should be adjusted and determined in situ for each pipe system. The plural openings 79 of FIG. 9 is advantageously provided for such adjustment of the distances between the transmitting-receiving devices.

In FIG. 9, the combination of the positioning poles 77, plural openings 79 and the positioning member 78 is favorably employable for adjusting the distance between the two ultrasonic transmitting-receiving devices 12. The seat materials 81, 83 are favorably employed for stably fixing the pipe between the case 70 and the flowmeter-fixing aid 72.

Figure 10:
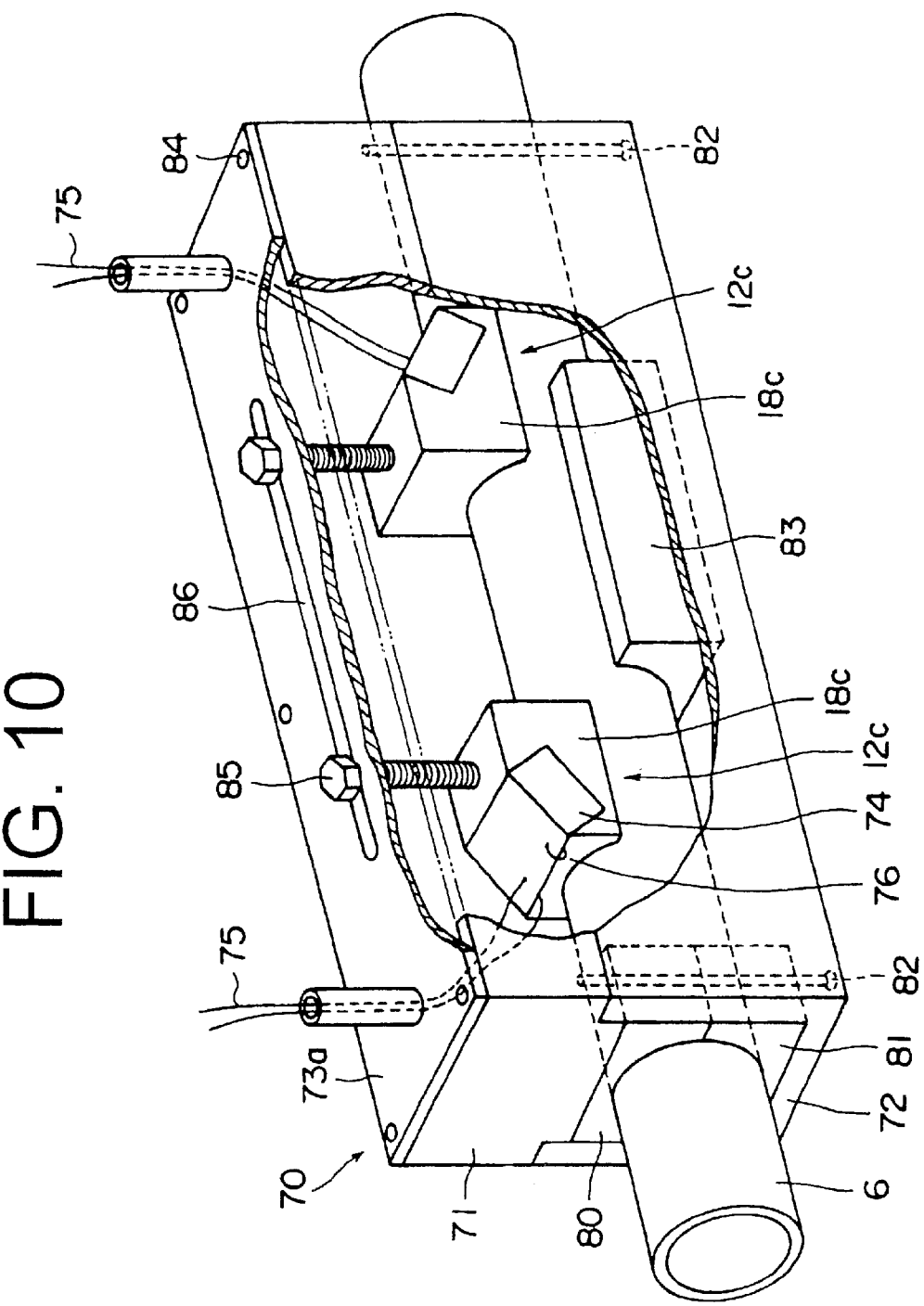
FIG. 10 is a partially cutaway schematic view of a clamp-on ultrasonic flowmeter according to the invention.

FIG. 10 illustrates a variation of the flow rate-measuring structure of FIG. 9., in which a combination of the positioning bolts 85 and a single opening 86 is favorably employable for adjusting the distance between the two ultrasonic transmitting-receiving devices 12c having a vessel 18c.

A rate of sonic wave propagation of the ultrasonic propagating layer to be attached onto a pipe wall preferably is in the range of 1,000 to 2,000 m/sec. For instance, the polyurethane gel has a rate of sonic wave propagation of approx. 1,400 m/sec., while grease has a rate of sonic wave propagation of approx. 1,500 m/sec. The fiber-reinforced resinous material preferably utilized for the first ultrasonic propagating member typically has a rate of approximately 3,000 m/sec., in the direction perpendicular to the longitudinal direction of the high modulus fibers.

Accordingly, the clamp-on ultrasonic flowmeter of the invention is more favorably employable for measuring a flow rate of a fluid passing in a pipe or tube whose wall is made of material having a rate of sonic wave propagation similar to that of the second ultrasonic propagating member of the invention. Preferred materials of the pipe wall are metal (such as iron, specifically stainless steel having a rate of sonic wave propagation of approx. 5,000 m/sec.), polyvinyl chloride resin having a rate of sonic wave propagation of approx. 2,200 m/sec., and fluororesin having a rate of sonic wave propagation of approx. 1,200 m/sec. The clamp-on ultrasonic flowmeter and the ultrasonic transmitting-receiving device are preferably employed in conjunction with a fluororesin pipe.

When a fluid passing within a pipe made of stainless steel is measured in its flow rate, the angle of the slanting surface to the bottom surface of the ultrasonic propagating element is preferably set to 5 to 25°, while a fluid passing within a pipe made of polyvinyl chloride is measured in its flow rate, the angle of the slanting surface to the bottom surface of the ultrasonic propagating element is preferably set to 25 to 45°.

In the above-mentioned explanation, the effect provided by the contact material is not mentioned, for the sake of simplifying the explanation. For the actually employed flowmeter, however, the design and arrangement of the ultrasonic transmitting-receiving devices are adjusted in consideration of the presence of the contact material. The adjustment and arrangement can be easily performed utilizing the Snell's Law.

The clamp-on ultrasonic flowmeter of the invention can be manufactured in the form of a combination of a pipe element having a joint at each end and the clamp-on ultrasonic flowmeter attached to the pipe element. The ultrasonic flowmeter of this structure can be placed in a pipe system in place of a detachable pipe element. This replacement system is favorably employed in the case that the pipe system contains a detachable pipe element.

The present invention is further described by the following examples.

COMPARISON EXAMPLE 1

Prior Art

A commercially available clamp-on ultrasonic flowmeter (supplied by Tokyo Keiso Co., Ltd) was attached to a fluororesin pipe (outer diameter: ¼ inch, made of polytetrafluoroethylene, PTFE, rate of sonic propagation: 1,222 m/sec.) in the V-mode. The attachment of a pair of the ultrasonic transmitting-receiving devices onto the pipe surface was made using grease. In the pipe, water was passed at 20° C. To the ultrasonic transducer of the ultrasonic transmitting-receiving device on the transmitter side was applied a voltage pulse (pulse width: 0.5 μsec., pulse height: 15 V). A ultrasonic wave transmitted by the device on the transmitter side was received by the ultrasonic transmitting-receiving device on the receiver side after propagating through the pipe wall portions and passing fluid.

The maximum amplitude of the voltage waveform obtained in the receiver device was 1.1 V.

EXAMPLE 1

A commercially available fiber-reinforced resinous material block (made of epoxy resin and carbon fibers having a tensile modulus in the longitudinal direction of 240 GPa) was cut to produce the ultrasonic propagating disc (diameter 10 mm, thickness: 0.75 mm).

Separately, on both sides of a commercially available ultrasonic transducer (diameter: 10 mm, thickness: 1 mm, made of lead zirconate titanate, PZT) was attached an electrode and a lead line. Thus processed transducer was attached to the ultrasonic propagating disc using an adhesive to give a composite.

Independently, a high density polyethylene block was cut to produce a vessel illustrated in FIG. 3 and FIG. 4. The vessel illustrated in FIGS. 3 and 4 had the following sizes: W=14.0 mm, D=13.5 mm, $L_1$=18.9 mm, $L_2$=7.8 mm, $L_3$=7.5 mm, $H_1$7 mm, $H_2$=14.7. On the upper surface of the vessel was produced a hole having a diameter of 8 mm ($D_2$). In the space of the vessel was placed the composite of the ultrasonic propagating disc and ultrasonic transducer. Into the upper opening of the vessel, a curable epoxy resin was poured and then cured so as to fix the composite in the space.

Subsequently, a two-pack polyurethane gel was placed in the hollow space from the opening of the bottom of the of the vessel, and on the bottom of the polyurethane gel was placed the pipe under pressure. The polyurethane gel was then hardened to give the ultrasonic propagating layer.

Thus, a ultrasonic transmitting-receiving device of the invention was produced. The angle (α) between the normal of the bottom plane of the transducer and the bottom plane of the ultrasonic propagating layer was 30°. Therefore, the ultrasonic wave was to impinge onto the outer surface of the pipe at an angle of incidence of 60. The sonic propagation rate of the hardened polyurethane gel was 1,780 m/sec. (at 25° C.), and the rate of penetration was 50 (at 25° C.).

The procedures of measurement of the flow rate of water passing within the pipe described in Comparison Example 1 were repeated at 10° C., 20° C., and 30° C., using the pair of the ultrasonic transmitting-receiving devices produced above.

Figure 11:
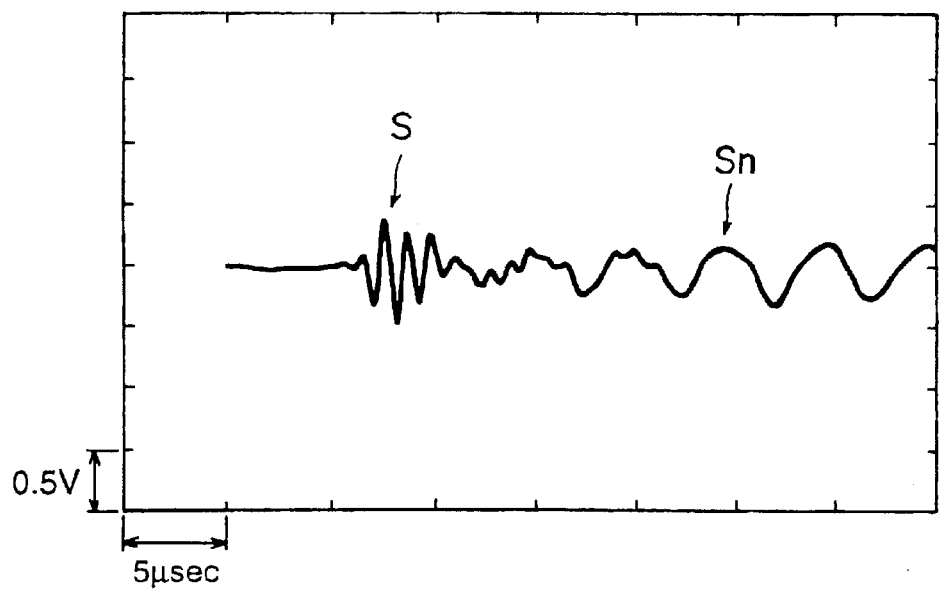
FIG. 11 a waveform which is output from the ultrasonic receiving device of Example 1 at 10° C.

The waveform of the ultrasonic wave obtained in the transmitter device at 10° C. is shown in FIG. 11. In FIG. 8, the voltage waveform indicated by Sn which has a wave of long frequency is a noise produced by the ultrasonic wave propagating in the pipe wall. The voltage wave form indicated by S which has a wave of short frequency is the received signal. The maximum amplitude of the voltage waveform received in the receiver device was approx. 0.9 V.

Figure 12:
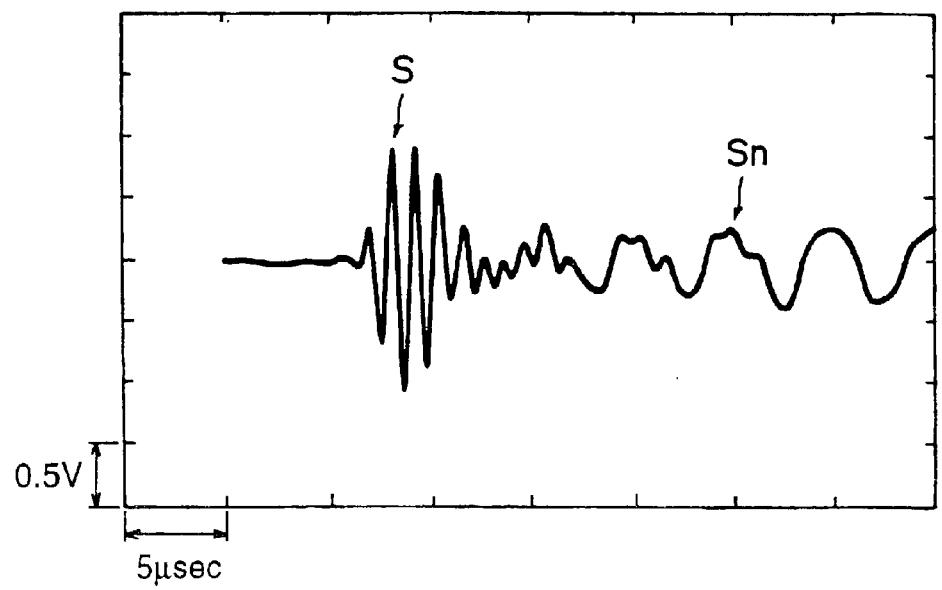
FIG. 12 a waveform which is output from the ultrasonic receiving device of Example 1 at 20° C.

The waveform of the ultrasonic wave obtained in the transmitter device at 20° C. is shown in FIG. 12. The maximum amplitude of the voltage waveform received in the receiver device was approx. 2.0 V, which is more than 1.8 times as much as that obtained in the use of the conventional clamp-on ultrasonic flowmeter.

Figure 13:
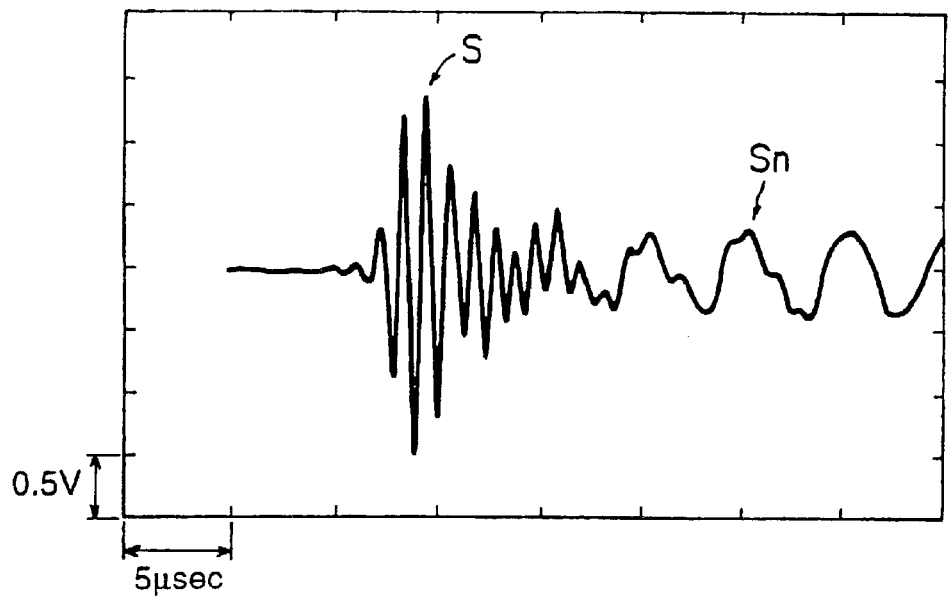
FIG. 13 a waveform which is output from the ultrasonic receiving device of Example 1 at 30° C.

The waveform of the ultrasonic wave obtained in the transmitter device at 30° C. is shown in FIG. 13. The maximum amplitude of the voltage waveform received in the receiver device was approx. 2.9 V.

EXAMPLE 2

The procedures of Example 1 were repeated except that the ultrasonic propagating layer was produced from a two-pack silicone gel and the angle (α) between the normal of the bottom plane of the transducer and the bottom plane of the ultrasonic propagating layer was changed to 55° Therefore, the ultrasonic wave was to impinge onto the outer surface of the pipe at an angle of incidence of 35°. The sonic propagation rate of the hardened silicone gel was 1,130 m/sec. (at 25° C.), and the rate of penetration was 65 (at 25° C.).

The procedures of measurement of the flow rate of water passing within the pipe described in Example 1 were repeated at 10° C., 20° C., and 30° C., using the pair of the ultrasonic transmitting-receiving devices produced above.

Figure 14:
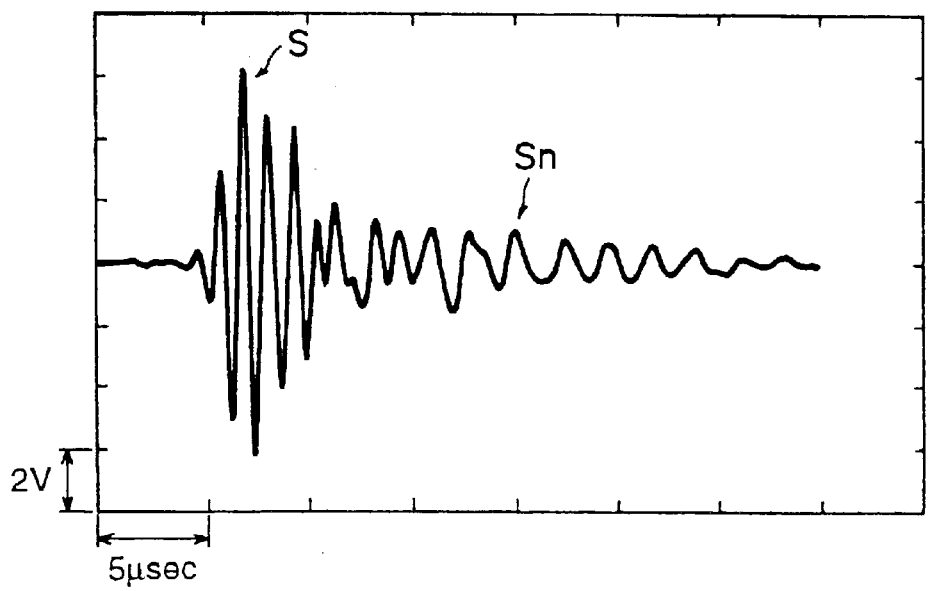
FIG. 14 a waveform which is output from the ultra-sonic receiving device of Example 2 at 10° C.

The waveform of the ultrasonic wave obtained in the transmitter device at 10° C. is shown in FIG. 14. The maximum amplitude of the voltage waveform received in the receiver device was approx. 12.8 V.

Figure 15:
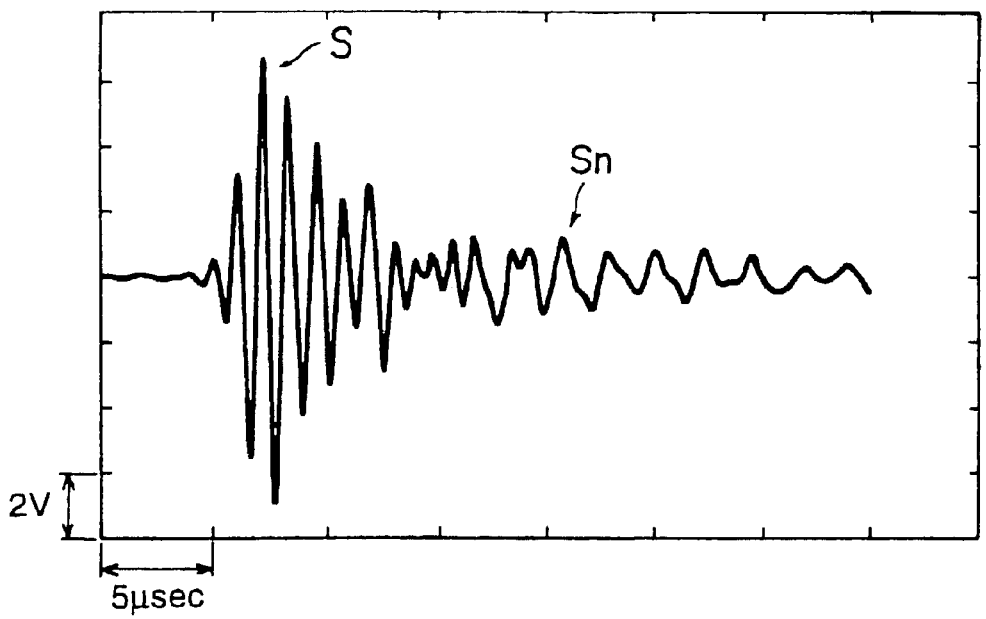
FIG. 15 a waveform which is output from the ultrasonic receiving device of Example 2 at 20° C.

The waveform of the ultrasonic wave obtained in the transmitter device at 20° C. is shown in FIG. 15. The maximum amplitude of the voltage waveform received in the receiver device was approx. 13.8 V, which is more than 12 times as much as that obtained in the use of the conventional clamp-on ultrasonic flowmeter.

Figure 16:
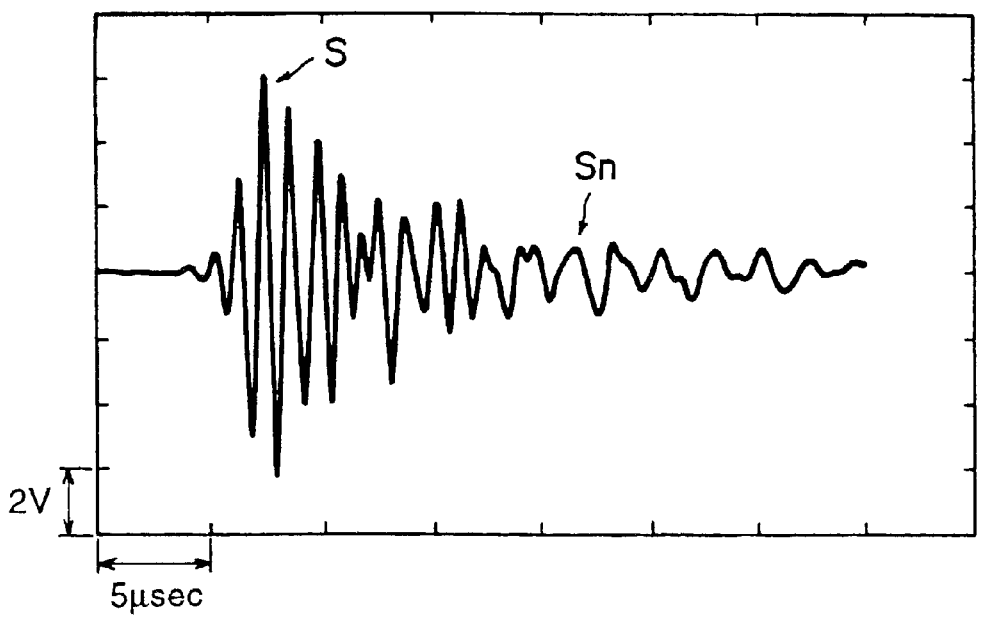
FIG. 16 a waveform which is output from the ultrasonic receiving device of Example 3 at 30° C.

The waveform of the ultrasonic wave obtained in the transmitter device at 30° C. is shown in FIG. 16. The maximum amplitude of the voltage waveform received in the receiver device was approx. 12.8 V.

The results indicate that silicone gel is employable more advantageously than polyurethane gel. Further, the use of the silicon gel is preferred particularly in the case that the flowmeter is to be used at a low temperature.

What is claimed is:

1. A flow rate-measuring structure comprising a pipe in which a fluid flows and a pair of ultrasonic transmitting-receiving devices arranged on the pipe at an outer surface thereof, each transmitting-receiving device comprising a composite of an ultrasonic transducer and an ultrasonic propagating element which propagates an ultrasonic wave transmitted by the transducer predominantly in the direction perpendicular to a plane of the transducer, the composite being arranged at an acute angle from the center line of the pipe, and an ultrasonic propagating layer placed between the ultrasonic propagating element and the pipe, which has a viscosity in the range of $0.5 \times 10^{-3}$ to $3 \times 10$ Pa-sec at 25° C. and a rate of sonic propagation in terms of $V_1$ at 25° C. satisfying the condition of $0.5 < V_1/V_2 < 1.7$ in which $V_2$ represents a rate of sonic propagation of material of the pipe at 25° C., the ultrasonic propagating layer being placed in a case having an opening on a bottom surface thereof.

2. The flow rate-measuring structure of claim 1, wherein the ultrasonic propagating layer comprises a liquid.

3. The flow rate-measuring structure of claim 1, wherein the ultrasonic propagating layer comprises water, oil, glycerol, water glass, vaseline, or grease.

4. The flow rate-measuring structure of claim 1, wherein both of the composite and the ultrasonic propagating layer are placed in a case having an opening on a bottom surface thereof.

5. The flow rate-measuring structure of claim 1, wherein the ultrasonic propagating element is composed of a plurality of sheet units in which each sheet unit is composed of plural high modulus fibers aligned in parallel in resinous material.

6. The flow rate-measuring structure of claim 5, wherein the sheet units of the ultrasonic propagating element are produced under the condition that the high modulus fibers in one sheet unit are arranged to make a right angle with the high modulus fibers in an adjoining sheet unit.

7. The flow rate-measuring structure of claim 1, wherein the pipe is made of fluororesin.

8. A flow rate-measuring structure comprising a pipe in which a fluid flows and a pair of ultrasonic transmitting-receiving devices arranged on the pipe at an outer surface thereof, each transmitting-receiving device comprising a composite of an ultrasonic transducer and an ultrasonic propagating element which propagates an ultrasonic wave transmitted by the transducer predominantly in the direction perpendicular to a plane of the transducer, the composite being arranged at an acute angle from the center line of the pipe, and an ultrasonic propagating layer placed between the ultrasonic propagating element and the pipe, which has a rate of penetration of needle in the range of 10 to 300 at 25° C. and a rate of sonic propagation in terms of $V_1$ at 25° C. satisfying the condition of $0.5 < V_1/V_2 < 1.7$ in which $V_2$ represents a rate of sonic propagation of material of the pipe at 25° C., the ultrasonic propagating layer being placed in a case having an opening on a bottom surface thereof.

9. The flow rate-measuring structure of claim 8, wherein the ultrasonic propagating layer comprises elastic material.

10. The flow rate-measuring structure of claim 8, wherein the ultrasonic propagating layer comprises polymeric gel.

11. The flow rate-measuring structure of claim 8, wherein the ultrasonic propagating layer comprises polyurethane gel or silicone gel.

12. The flow rate-measuring structure of claim 8, wherein both of the composite and the ultrasonic propagating layer are placed in a case having an opening on a bottom surface thereof.

13. The flow rate-measuring structure of claim 8, wherein the ultrasonic propagating element is composed of a plurality of sheet units in which each sheet unit is composed of plural high modulus fibers aligned in parallel in resinous material.

14. The flow rate-measuring structure of claim 13, wherein the sheet units of the ultrasonic propagating element are produced under the condition that the high modulus fibers in one sheet unit are arranged to make a right angle with the high modulus fibers in an adjoining sheet unit.

15. The flow rate-measuring structure of claim 8, wherein the pipe is made of fluororesin.

16. An ultrasonic transmitting-receiving device comprising a composite of an ultrasonic transducer and an ultrasonic propagating element which propagates an ultrasonic wave transmitted by the transducer predominantly in the direction perpendicular to a plane of the transducer, the composite being arranged at an acute angle from the center line of the pipe, and an ultrasonic propagating layer placed between the ultrasonic propagating element and the pipe, which has a viscosity in the range of $0.5 \times 10^{-3}$ to $3 \times 10$ Pa-sec at 25° C. and a rate of sonic propagation at 25° C. is in the range of 700 to 2,000 m/sec, the ultrasonic propagating layer being placed in a case having an opening on a bottom surface thereof.

17. The ultrasonic transmitting-receiving device of claim 16, wherein the ultrasonic propagating layer comprises a liquid.

18. The ultrasonic transmitting-receiving device of claim 16, wherein the ultrasonic propagating layer comprises water, oil, glycerol, water glass, vaseline, or grease.

19. The ultrasonic transmitting-receiving device of claim 16, wherein both of the composite and the ultrasonic propagating layer are placed in a case having an opening on a bottom surface thereof.

20. The ultrasonic transmitting-receiving device of claim 16, wherein the ultrasonic propagating element is composed of a plurality of sheet units in which each sheet unit is composed of plural high modulus fibers aligned in parallel in resinous material.

21. The ultrasonic transmitting-receiving device of claim 20, wherein the sheet units of the ultrasonic propagating element are produced under the condition that the high modulus fibers in one sheet unit are arranged to make a right angle with the high modulus fibers in an adjoining sheet unit.

22. An ultrasonic transmitting-receiving device comprising a composite of an ultrasonic transducer and an ultrasonic propagating element which propagates an ultrasonic wave transmitted by the transducer predominantly in the direction perpendicular to a plane of the transducer, the composite being arranged at an acute angle from the center line of the pipe, and an ultrasonic propagating layer placed between the ultrasonic propagating element and the pipe, which has a rate of penetration of needle in the range of 10 to 300 at 25° C. and a rate of sonic propagation at 25° C. is in the range of 700 to 2,000 m/sec, the ultrasonic propagating layer being placed in a case having an opening on a bottom surface thereof.

23. The ultrasonic transmitting-receiving device of claim 22, wherein the ultrasonic propagating layer comprises elastic material.

24. The ultrasonic transmitting-receiving device of claim 22, wherein the ultrasonic propagating layer comprises polymeric gel.

25. The ultrasonic transmitting-receiving device of claim 24, wherein the ultrasonic propagating layer comprises polyurethane gel or silicone gel.

26. The ultrasonic transmitting-receiving device of claim 22, wherein both of the composite and the ultrasonic propagating layer are placed in a case having an opening on a bottom surface thereof.

27. The ultrasonic transmitting-receiving device of claim 22, wherein the ultrasonic propagating element is composed of a plurality of sheet units in which each sheet unit is composed of plural high modulus fibers aligned in parallel in resinous material.

28. The ultrasonic transmitting-receiving device of claim 22, wherein the sheet units of the ultrasonic propagating element are produced under the condition that the high modulus fibers in one sheet unit are arranged to make a right angle with the high modulus fibers in an adjoining sheet unit.

29. A flow rate-measuring structure comprising a pipe in which a fluid flows and a pair of ultrasonic transmitting-receiving devices arranged on the pipe at an outer surface thereof, each transmitting-receiving device comprising a composite of an ultrasonic transducer and an ultrasonic propagating element which propagates an ultrasonic wave transmitted by the transducer predominantly in the direction perpendicular to a plane of the transducer, the composite being arranged at an acute angle from the center line of the pipe, and an ultrasonic propagating layer placed between the ultrasonic propagating element and the pipe, which has a viscosity in the range of $0.5 \times 10^{-3}$ to $3 \times 10$ Pa-sec at 25° C. and a rate of sonic propagation in terms of $V_1$ at 25° C. satisfying the condition of $0.5 < V_1/V_2 < 1.7$ in which $V_2$ represents a rate of sonic propagation of material of the pipe at 25° C., the ultrasonic propagating element being composed of a plurality of sheet units in which each sheet unit is composed of plural high modulus fibers aligned in parallel in resinous material.

30. The flow rate-measuring structure of claim 29, wherein the sheet units of the ultrasonic propagating element are produced under the condition that the high modulus fibers in one sheet unit are arranged to make a right angle with the high modulus fibers in an adjoining sheet unit.

31. A flow rate-measuring structure comprising a pipe in which a fluid flows and a pair of ultrasonic transmitting-receiving devices arranged on the pipe at an outer surface thereof, each transmitting-receiving device comprising a composite of an ultrasonic transducer and an ultrasonic propagating element which propagates an ultrasonic wave transmitted by the transducer predominantly in the direction perpendicular to a plane of the transducer, the composite being arranged at an acute angle from the center line of the pipe, and an ultrasonic propagating layer placed between the ultrasonic propagating element and the pipe, which has a rate of penetration of needle in the range of 10 to 300 at 25° C. and a rate of sonic propagation in terms of $V_1$ at 25° C. satisfying the condition of $0.5 < V_1/V_2 < 1.7$ in which $V_2$ represents a rate of sonic propagation of material of the pipe at 25° C., the ultrasonic propagating element being composed of a plurality of sheet units in which each sheet unit is composed of plural high modulus fibers aligned in parallel in resinous material.

32. The flow rate-measuring structure of claim 31, wherein the sheet units of the ultrasonic propagating element are produced under the condition that the high modulus fibers in one sheet unit are arranged to make a right angle with the high modulus fibers in an adjoining sheet unit.

33. An ultrasonic transmitting-receiving device comprising a composite of an ultrasonic transducer and an ultrasonic propagating element which propagates an ultrasonic wave transmitted by the transducer predominantly in the direction perpendicular to a plane of the transducer, the composite being arranged at an acute angle from the center line of the pipe, and an ultrasonic propagating layer placed between the ultrasonic propagating element and the pipe, which has a viscosity in the range of $0.5 \times 10^{-3}$ to $3 \times 10$ Pa-sec at 25° C. and a rate of sonic propagation at 25° C. is in the range of 700 to 2,000 m/sec, the ultrasonic propagating element being composed of a plurality of sheet units in which each sheet unit is composed of plural high modulus fibers aligned in parallel in resinous material.

34. The ultrasonic transmitting-receiving device of claim 33, wherein the sheet units of the ultrasonic propagating element are produced under the condition that the high modulus fibers in one sheet unit are arranged to make a right angle with the high modulus fibers in an adjoining sheet unit.

35. An ultrasonic transmitting-receiving device comprising a composite of an ultrasonic transducer and an ultrasonic propagating element which propagates an ultrasonic wave transmitted by the transducer predominantly in the direction perpendicular to a plane of the transducer, the composite being arranged at an acute angle from the center line of the pipe, and an ultrasonic propagating layer placed between the ultrasonic propagating element and the pipe which has a rate of penetration of needle in the range of 10 to 300 at 25° C. and a rate of sonic propagation at 25° C. is in the range of 700 to 2,000 m/sec, the ultrasonic propagating element being composed of a plurality of sheet unites in which each sheet unit is composed of plural high modulus fibers aligned in parallel resinous material.

36. The ultrasonic transmitting-receiving device of claim 35, wherein the sheet units of the ultrasonic propagating element are produced under the condition that the high modulus fibers in one sheet unit are arranged to make a right angle with the high modulus fibers in an adjoining sheet unit.

* * * * *